US00RE42649E

(19) United States
(12) Reissued Patent
Schultz

(10) Patent Number: US RE42,649 E
(45) Date of Reissued Patent: Aug. 30, 2011

(54) PICTURE LEVELING/POSITIONING TEMPLATE

(76) Inventor: Erich George Schultz, New York, NY (US)

(21) Appl. No.: 11/351,217

(22) Filed: Feb. 9, 2006

Related U.S. Patent Documents

Reissue of:
(64) Patent No.: 6,880,259
Issued: Apr. 19, 2005
Appl. No.: 10/735,682
Filed: Dec. 15, 2003

(51) Int. Cl.
*G01D 21/00* (2006.01)

(52) U.S. Cl. ..... 33/613; 33/1 G; 33/566

(58) Field of Classification Search ..... 33/1 G, 33/562, 563, 566, 613, 645; 434/74, 75
See application file for complete search history.

(56) References Cited

U.S. PATENT DOCUMENTS

| | | | | | |
|---|---|---|---|---|---|
| 2,595,142 | A | * | 4/1952 | Herck | 264/31 |
| 2,667,704 | A | | 2/1954 | Dunn | |
| 3,057,073 | A | * | 10/1962 | Swartz | 33/613 |
| 3,339,302 | A | | 9/1967 | Mallory | |
| 3,523,382 | A | | 8/1970 | Dreyer | |
| 4,100,681 | A | | 7/1978 | Hollander | |
| 4,208,802 | A | | 6/1980 | Berndt | |
| 4,443,949 | A | * | 4/1984 | Newton | 33/613 |
| 4,457,485 | A | * | 7/1984 | Landt | 248/542 |
| 4,580,352 | A | * | 4/1986 | Wilson | 33/563 |
| 4,936,033 | A | | 6/1990 | Lacko | |
| 4,976,055 | A | | 12/1990 | Kane | |
| 5,063,679 | A | * | 11/1991 | Schwandt | 33/347 |
| 5,076,612 | A | * | 12/1991 | Nirmel | 283/67 |
| 5,195,249 | A | * | 3/1993 | Jackson | 33/528 |
| 5,463,817 | A | | 11/1995 | Leeds | |
| 6,449,863 | B1 | * | 9/2002 | Voorhees | 33/613 |
| 6,473,984 | B1 | * | 11/2002 | Splain et al. | 33/613 |
| 6,553,683 | B1 | * | 4/2003 | Klass et al. | 33/562 |
| 6,618,955 | B2 | * | 9/2003 | Rice | 33/613 |
| 6,775,915 | B2 | * | 8/2004 | Stephens | 33/562 |
| 7,185,441 | B2 | * | 3/2007 | Lockyer | 33/562 |
| 2005/0011079 | A1 | * | 1/2005 | Sikora et al. | 33/566 |
| 2005/0277093 | A1 | * | 12/2005 | Kelly et al. | 434/80 |

OTHER PUBLICATIONS

McGraw, Terri, "Mrs. Fixit Easy Home Repair," "Picture Groupings," p. 92, Simon & Shuster (2001).
Pages 16 and 17 from "Where There's a Wall There's a Wayl 101 Wall Grouping Ideas" (1986) National Design Associates, 19581 Topeka, Suite A, Huntington Beach, Ca 92646.
Cover Page from "Where There's a Wayl 101 Wall Grouping ideas" (1986) National Design Associates, 19581 Topeka, Suite A, Huntington Beach, Ca 92646.

* cited by examiner

*Primary Examiner*—Amy Cohen Johnson
(74) *Attorney, Agent, or Firm*—Carr & Ferrell LLP

(57) ABSTRACT

The present invention 10 discloses an inexpensive, reusable, and compact picture leveling template where the design of the device 10 would allow the user 12 to arrange picture frames 14, shadow boxes 70, shelving 77, signage, or any objects with 2 or 3 dimensions that could be mounted on a wall 16 in a preferred arrangement in limitless aesthetic combinations on a vertical surface of any size or slope along with curved wall surfaces. The template 10 has multiple leveling guides 24, 28, 32 to assist the user 12 in leveling and spacing picture frames 14 horizontally and vertically on any vertical surface 16. The present invention 10 may be a three-part, inexpensive compact kit comprised of a planar pliable material 18 with multiple leveling lines 34, 36 inscribed thereon, a non-shear adhesive 38, and bubble levels 40 for use with a non-shear adhesive.

2 Claims, 19 Drawing Sheets

PICTURE LEVELING/POSITIONING TEMPLATE

Matter enclosed in heavy brackets [ ] appears in the original patent but forms no part of this reissue specification; matter printed in italics indicates the additions made by reissue.

*CROSS-REFERENCE TO RELATED APPLICATIONS*

*More than one reissue application has been filed for the reissue of Pat. No. 6,880,259. The reissue applications are U.S. patent application Ser. Nos. 11/351,217 (the present application) and 12/883,069 filed on Sep. 15, 2010, which is a continuing reissue application of the present application.*

BACKGROUND OF THE INVENTION

1. Field of the Invention

The present invention relates generally to picture leveling/positioning and, more specifically, to an inexpensive, reusable, and compact picture leveling/positioning template where the design of the device would allow the user to arrange picture frames, shadow boxes, shelving, signage, or any objects with 2 or 3 dimensions that could be mounted on a wall in a preferred arrangement in limitless aesthetic combinations on a vertical surface of any size or slope and curved wall surfaces.

The template also has multiple leveling guides to assist the user in leveling and spacing picture frames horizontally and vertically on any vertical surface.

The invention is a three part inexpensive compact kit comprised of a planar pliable material with multiple leveling lines inscribed thereon, a non-shear adhesive, and bubble levels with a non-shear adhesive.

2. Description of the Prior Art

There are other level devices designed for leveling pictures. Typical of these is U.S. Pat. No. 2,667,704 issued to Carl H. Dunn on Mar. 18, 1952.

Another patent was issued to Gary E Mallory on Sep. 5, 1967 as U.S. Pat. No. 3,339,302. Yet another U.S. Pat. No. 3,523,382 was issued to Ronald L. Dreyer on Aug. 11, 1970 and still yet another was issued on Jul. 18, 1978 to Bruce L. Hollander as U.S. Pat. No. 4,100,681.

Another patent was issued to Stephen R. Berndt on Jun. 24, 1980 as U.S. Pat. No. 4,208,802. yet another U.S. Pat. No. 4,936,033 was issued to Mark Lacko on June 26, 1990. Another was issued to Michael Kane on Dec. 11, 1990 as U.S. Pat. No. 4,976,055 and still yet another was issued on Nov. 7, 1995 to Richard A. Leeds as U.S. Pat. No. 5,463,817.

In a bracket for leveling picture frames and the like, the combination which comprises a plate having an extended edge and with upwardly extended sections of unequal length on the ends, arms of unequal length with hooks extended from the upper ends extended upwardly from the sections at the ends of the plate, and means hinging said arms to the upwardly extended sections at the ends of the plate.

A frame structure for photographs, comprising: (a) a rectangular frame defining a central opening; (b) means for positioning a photograph in said opening; (c) a raised rim bordering said frame and having a set of slots therein defining a common plane parallel to, but offset from said frame; (d) a set of tongues extending outwardly from said rim in the same plane as said slots, said tongues and slots being so located as to permit the tongues of one frame structure to enter the slots of a companion frame structure thereby to join said frame structures.

Individual frames are provided with hooks or clamps which cooperate with holes or slots respectively in similar frames to secure adjacent frames together in various arrangements. A photograph, glass and backing are retained in position within the individual frames by an integrally formed, resilient clip which extends from one end of the fame. Several smaller frames are displaced independently or are mounted within a single larger frame.

An inexpensive spirit level having means for easy attachment to upper surface portions of picture frames or the like. The device comprises a transparent tape having blister-like cavities at regular intervals, a base tape affixed in face-to-face relation against one side of the transparent tape and having a pressure sensitive adhesive on the outside for attachment to a surface portion of a frame, and a liquid partially filling said cavities. Each blister cavity has a bubble corresponding to the unfilled space which bubbles will move along the curvature of the blister, thereby indicating the relative position of the device with respect to a horizontal plane. Suitable markings on the transparent tape are provided to facilitate reading level position with respect to the horizontal plane.

A mounting plate is attached to a picture frame and holds a removable liquid bubble level. The plate can be sheared by pushing the frame toward the wall. A card is provided for packaging several mounting plates with a single bubble level.

A unitary poster assembly molded of flexible synthetic plastic material, the assembly including a rectangular backing plate whose dimensions are slightly smaller than those of the poster. The plate is bordered by an integrated frame formed of top, bottom and left and right side branches, the top branch being spaced from the upper edge of the plate to form an inlet gap. The inner walls of the branches, save for the top branch, are slotted to define a U-shaped socket for receiving the corresponding margins of a poster supported on the backing plate. To install a poster, the top branch is momentarily bent back to admit the lower end of the poster into the inlet gap and to permit insertion of the side margins thereof into the slots of the side branches, the poster then being pushed down until its bottom margin lies in the of the bottom branch, at which point the poster is properly mounted. To thereafter remove the poster from the frame assembly, the top branch is again flexed, and the poster is pulled out of the socket.

A wall mountable frame comprises a rectangular pan-shaped frame including a main rectangular vertical rear wall having forwardly extending magnet-attracting marginal walls defining with said main wall a rectangular sign or poster receiving recess. Screw head-receiving holes are provided in said main vertical wall for receiving the heads of wall mounting anchoring screws which will be fully recessed in said holes, the defining walls of said holes being formed by rearwardly projection portions of said main vertical wall. Magnet bars are insertable along the inner margins of the marginal walls of the frame to hold the margins of sheet material upon said rear wall. Spacers are preferably in the form of double adhesive coated synthetic plastic foam strips are positioned behind said frame to extend along the margins of the rear wall of the frame. The strips space the hole-forming projecting portions of the rear wall from the mounting wall surface of the frame. The strips have a peelable outer layer to cover the outer adhesive layer thereof. The strips are compressed by the tightening of the screws when screws are the frame anchoring means, and can be used as the sole anchoring means of the frame when the peelable outer layer is removed therefrom.

A leveling device is provided that has a hollow thin rectangular housing and is constructed of transparent plastic. The housing holds two different types of fluids, such as oil and water, or a mix of air and fluid. The two immiscible fluids allow the device to be used as a level which operates when the line between the fluids aligns with a datum line that is etched or marked upon the surface of the transparent housing. The device can be attached to an article to be leveled by an adhesive back on the leveling device or alternatively by thumb tacks inserted through holes provided in the housing of the device. The relatively long line between fluids allows the device to be used in judging the degree to which the article is non-level relative to its environment, and also allows the device to hang an article at a specific angle relative to a wall, floor or ceiling. A version of the level can be constructed with a flexible and bendable housing to allow the level to be used to align objects of any shape.

While these leveling devices may be suitable for the purposes for which they were designed, they would not be as suitable for the purposes of the present invention, as hereinafter described.

SUMMARY OF THE PRESENT INVENTION

The present invention discloses an inexpensive, reusable, and compact picture leveling template where the design of the device would allow the user to arrange picture frames, shadow boxes, shelving, signage, or any objects with 2 or 3 dimensions that could be mounted on a wall in a preferred arrangement in limitless aesthetic combinations on a vertical surface of any size or slope along with curved wall surfaces. The template has multiple leveling guides to assist the user in leveling and spacing picture frames horizontally and vertically on any vertical surface. The present invention may be a three-part, inexpensive compact kit comprised of a planar pliable material with multiple leveling lines inscribed thereon, a non-shear adhesive, and bubble levels for use with a non-shear adhesive.

A primary object of the present invention is to provide limitless combinations of frame hangings in a precise manner.

Another object of the present invention is to provide a new and useful product to the market.

Yet another object of the present invention is to provide an effortless way to organize picture frames on a vertical surface.

Still yet another object of the present invention is to provide a template that would ensure the user proper placement of picture frames on vertical surfaces.

Another object of the present invention is to provide a reusable product.

Another object of the present invention is to provide multiple predetermined aesthetically pleasing functional frame configurations.

Yet another object of the present invention is to provide a system for exact replication by varying individuals in various spaces.

Still yet another object of the present invention is to provide an (all in one) solution for precise picture hanging.

Another object of the present invention is to allow the user to view, by way of the template, what the final execution of the frames on the wall will look like prior to execution.

Yet another object of the present invention is to allow the user maximum flexibility prior to execution by easy adjustments of template prior to execution.

Still yet another object of the present invention is to provide an (all in one) solution for precise shelf hanging.

Additional objects of the present invention will appear as the description proceeds.

The present invention overcomes the shortcomings of the prior art by providing a picture positioning template used to provide and indicate to the user where the optimum placement of a fastening element used for the attachment of a display or photograph should placed for an ideal aesthetic arrangement.

Additionally provided are a plurality of individual and segregated indicia which correlate to define to an individual when the present invention is placed at the proper elevation and square upon a vertical planar or curved surface wherein a shearable adhesive may be used to maintain the present invention in the selected position.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
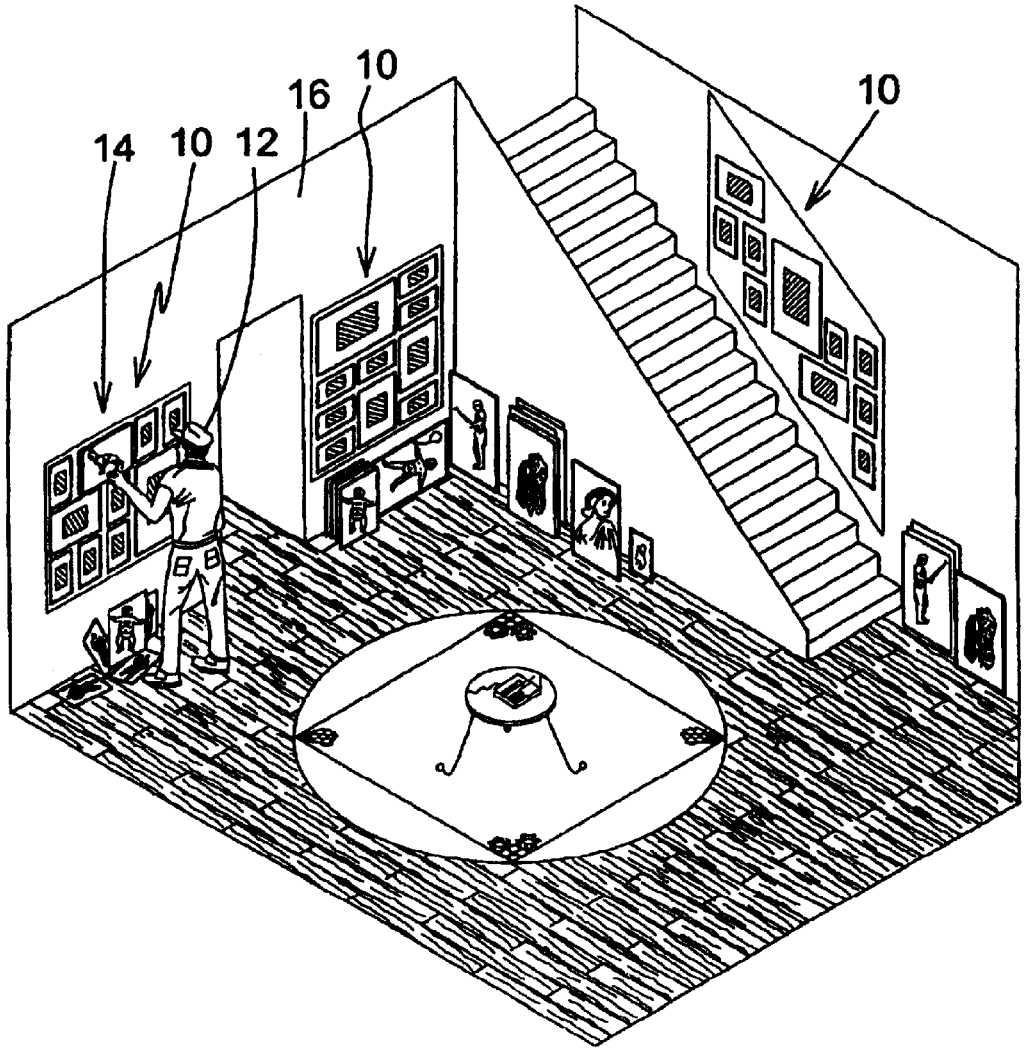
FIG. 1 is an illustrative view of the present invention in use.

With regard to reference numerals used, the following numbering is used throughout the drawings.

10 present invention
12 user
14 picture
16 vertical surface
18 planar pliable material
20 fastener placement markers
22 axial correlation guide
24 bubble level placement indicia
26 representative frame indicia
28 eye level guides
32 peripheral guides
34 central eye level guide
36 horizontal eye level guide line
38 non-shear adhesive
40 bubble leveler
42 edge
44 cutting guide
46 overlapping template area
48 staircase
50 landing
52 template
54 template
56 scissor cut
58 cut
60 individual frame template
62 tape
64 concave curved wall
66 convex curved wall
68 corner of wall
70 box
72 plasma television
74 representative shelf indicia
76 door
77 shelf
78 window
80 object
82 support
84 fastener

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. Shown is the present invention 10 being a picture positioning template used to provide and indicate to the user 12 where the optimum placement of a fastener used for the attachment of a display 14 or photograph should be placed for an ideal aesthetic arrangement. The template 10 additionally has a plurality of individual and segregated indicia which correlate to define to an individual user 12 when the present invention is placed at the proper elevation and being properly vertically and horizontally squared upon a vertical 16 planar or curved surface wherein a shearable adhesive may be used to maintain the present invention in the selected position.

Figure 2:
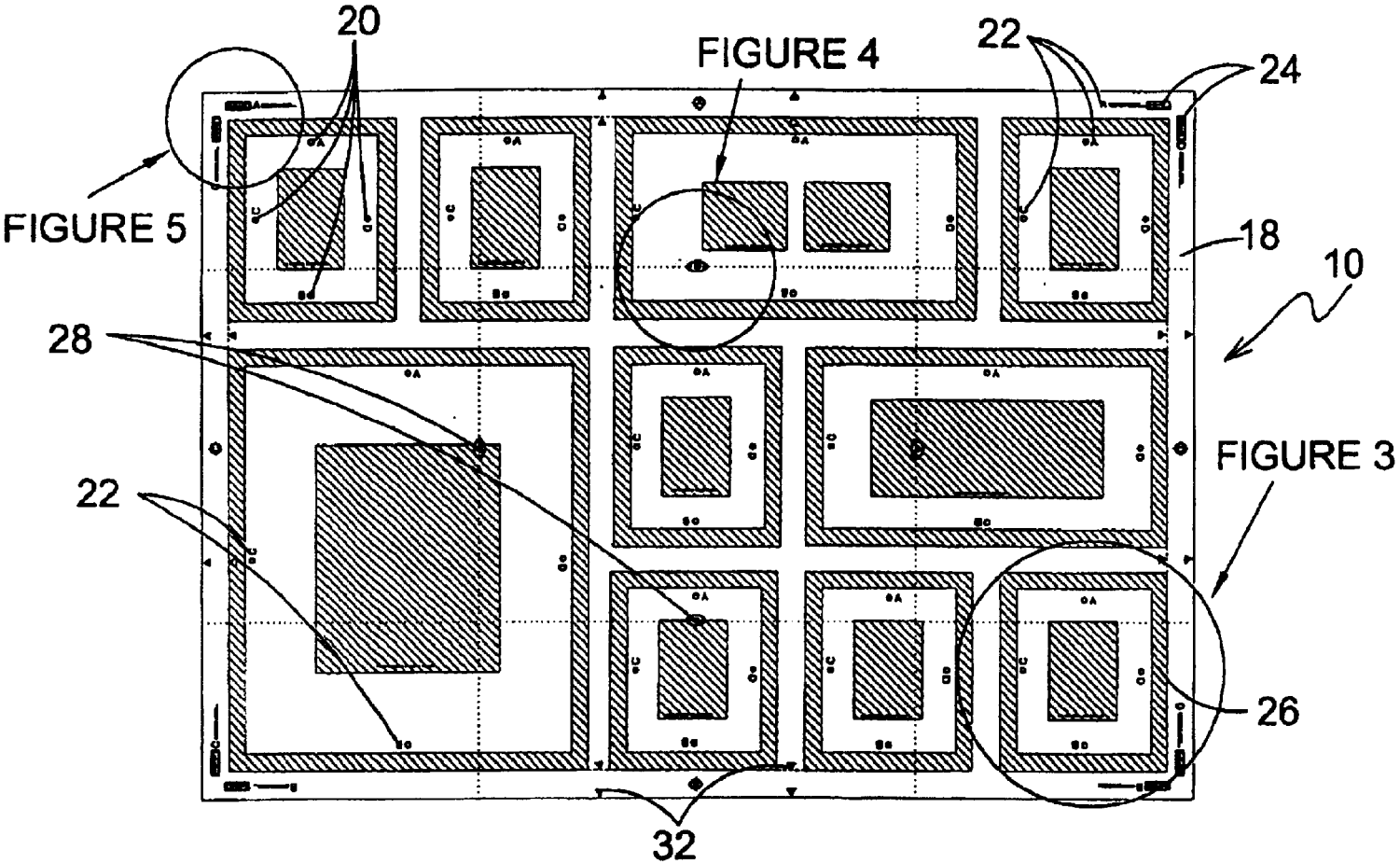
FIG. 2 is a front view of the present invention.

Turning to FIG. 2, shown therein is a front view of the present invention 10. Shown is the present invention 10 being a reusable sheet of planar pliable material 18 having a plurality of fastener placement markers 20 used to indicate the point where a fastener should be used along with having relative axial indicia inscribed to enable the user to coordinate what markers to use relative to the present inventions rotational placement. Also shown are axial correlation guides 22, bubble level placement indicia 24, representative frame indicia 26, eye level guides 28, and peripheral guides 32.

Figure 3:
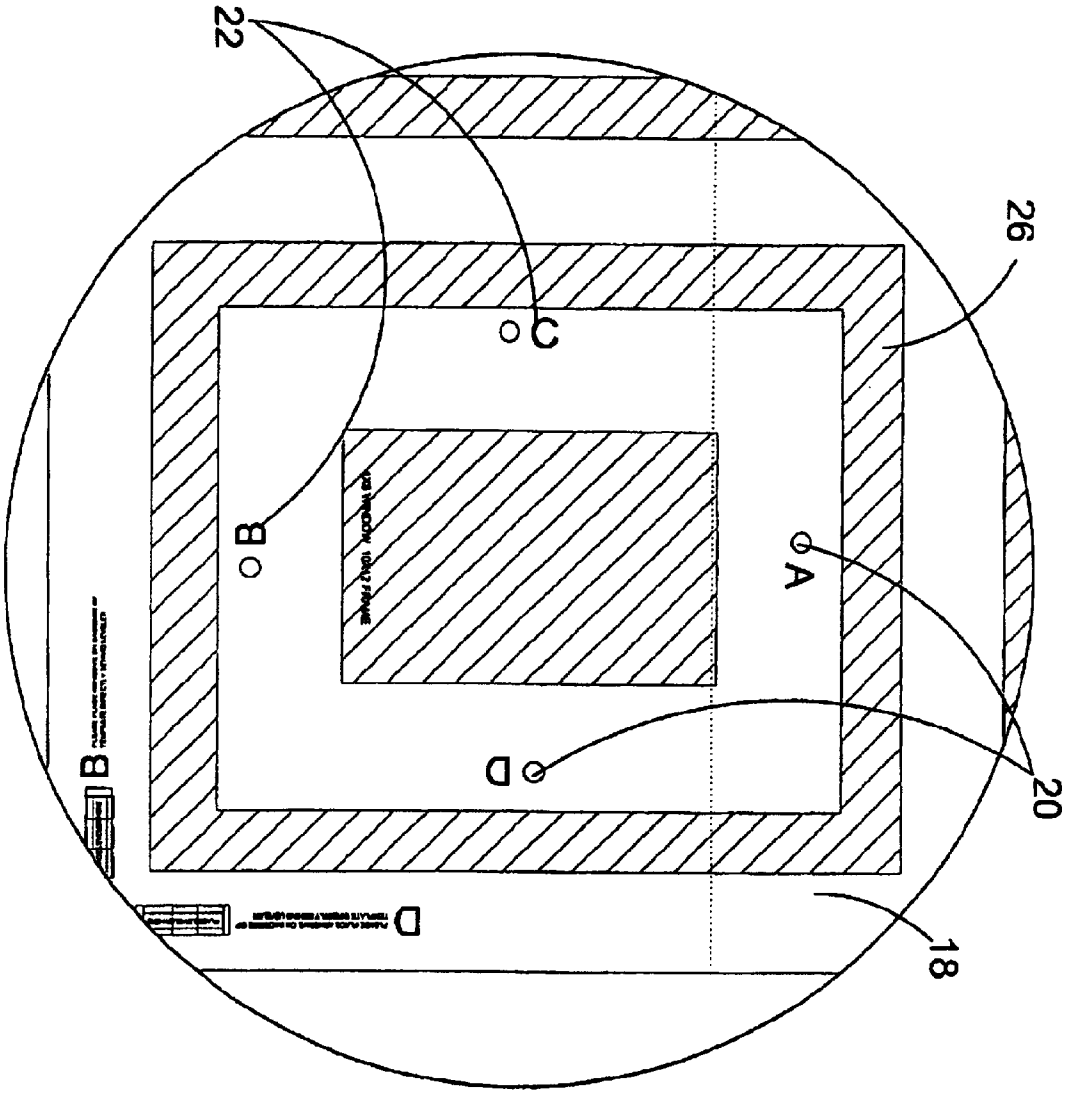
FIG. 3 is a detailed front view of the frame indicia of the present invention.

Turning to FIG. 3, shown therein is a detailed front view of the frame indicia 26 of the present invention. Shown is the present invention having frame indicia 26 representative of the placement of a predetermined frame size; e.g., 10 inch× 12 inch, inscribed thereon. Provided within the inner perimeter of the frame indicia 26 are fastener placement markers 20 with respective axial indicia or axial correlation guides 22 to express correct fastener (i.e., nail hole) placement for the related frame size. Also shown is planar pliable material 18. The present invention has a plurality of variously common-sized frame indicia 26 thereon wherein the indicia 26 are arranged in different configurations with the edges of the indicia 26 being parallel and symmetrically arranged with each other and all indicia.

Figure 4:
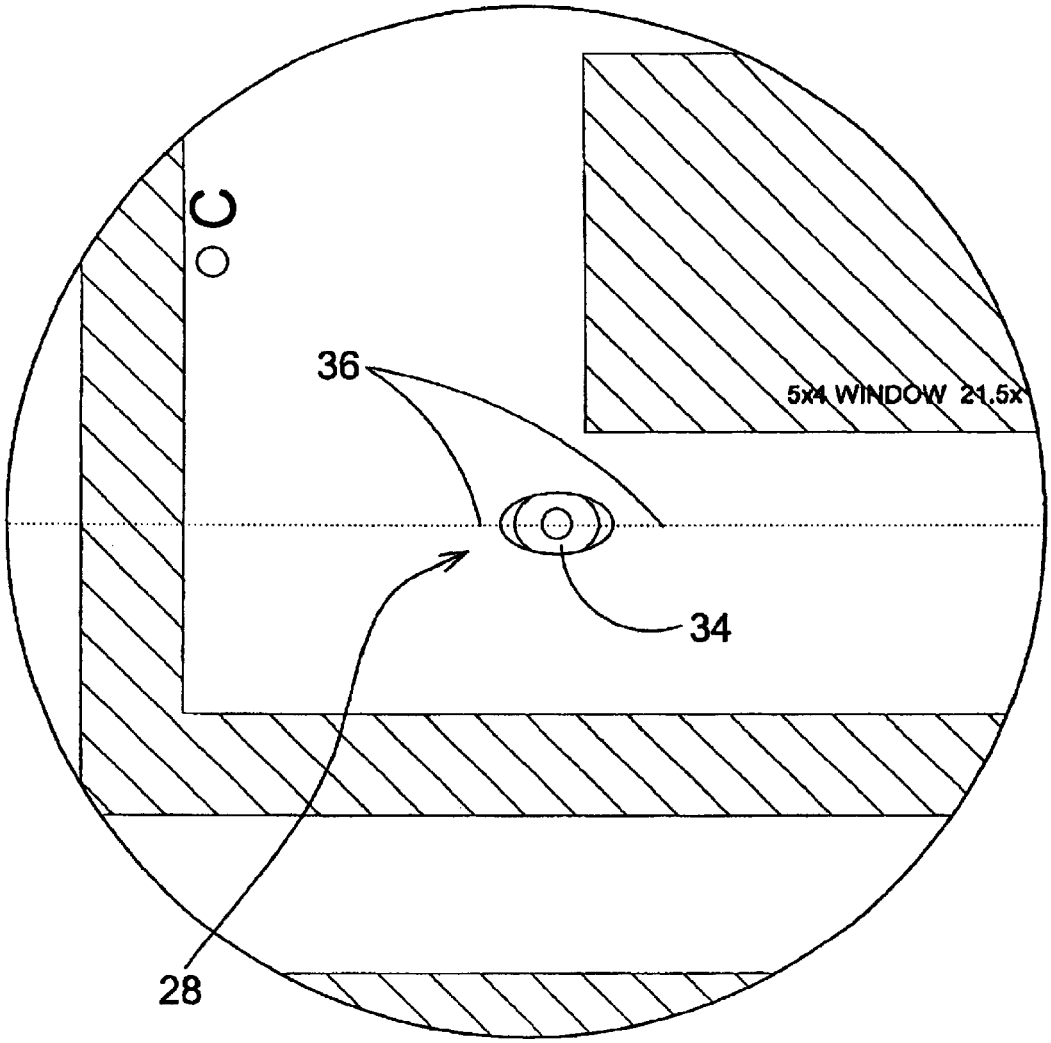
FIG. 4 is a detailed front view of the eye level guide of the present invention.

Turning to FIG. 4, shown therein a detailed front view of the eye level guide 28 of the present invention. Shown is the present invention having indicia representative of the elevation at which the present invention should and/or could be placed upon a vertical surface with respect to the viewer for correct picture group height being a centrally disposed eye level guide 34 and a horizontal eye level guide line 36.

Figure 5:
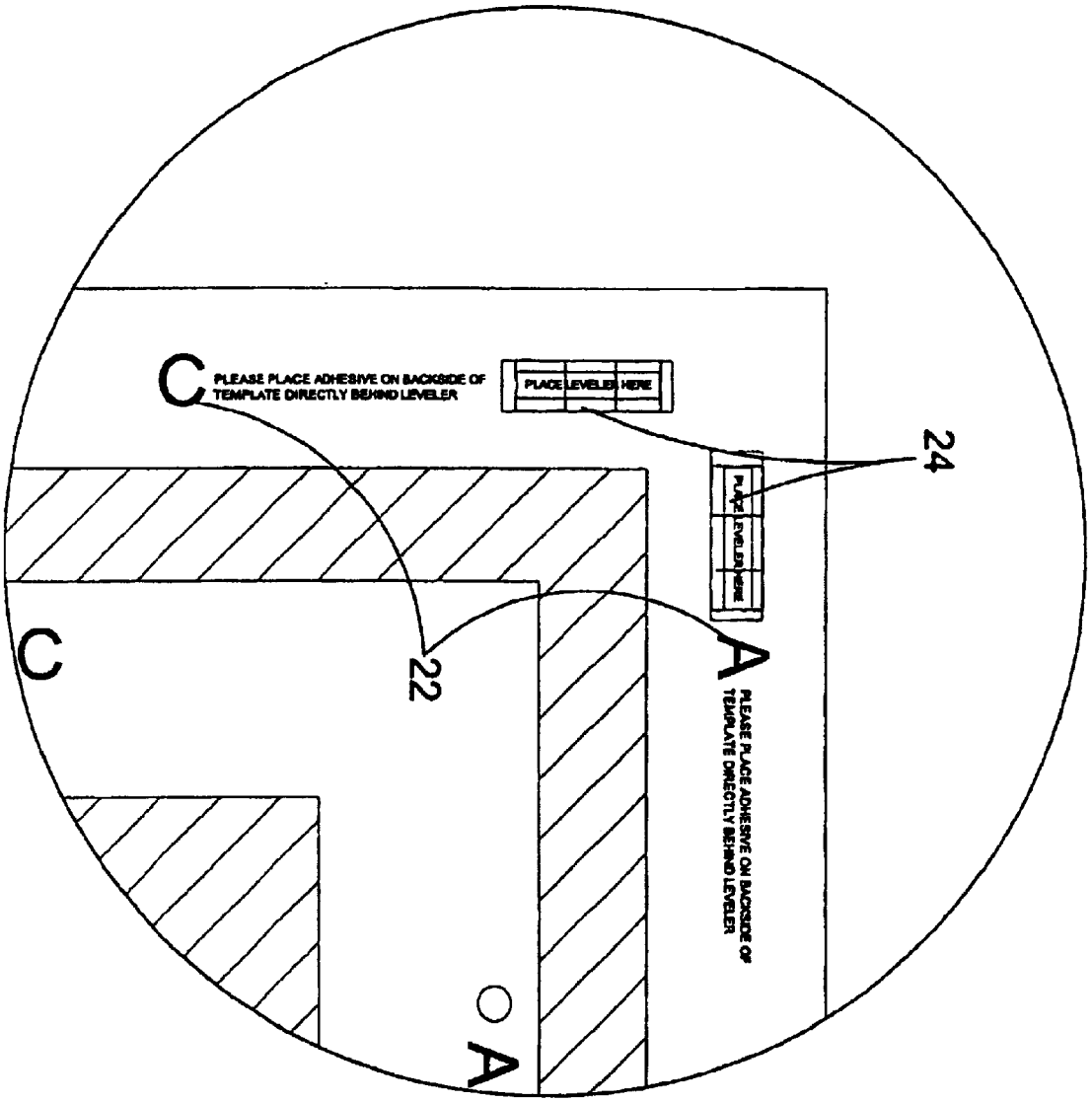
FIG. 5 is a detailed view of the level placement of the present invention.

Turning to FIG. 5, shown therein is a detailed view of the level placement of the present invention. Shown is the bubble level placement indicia 24 of the present invention having an area marked where a bubble leveler should be adhered to allow the user to horizontally and vertically square the present invention against a vertical surface. Also shown is the axial correlation guide or indicia 22.

Figure 6:
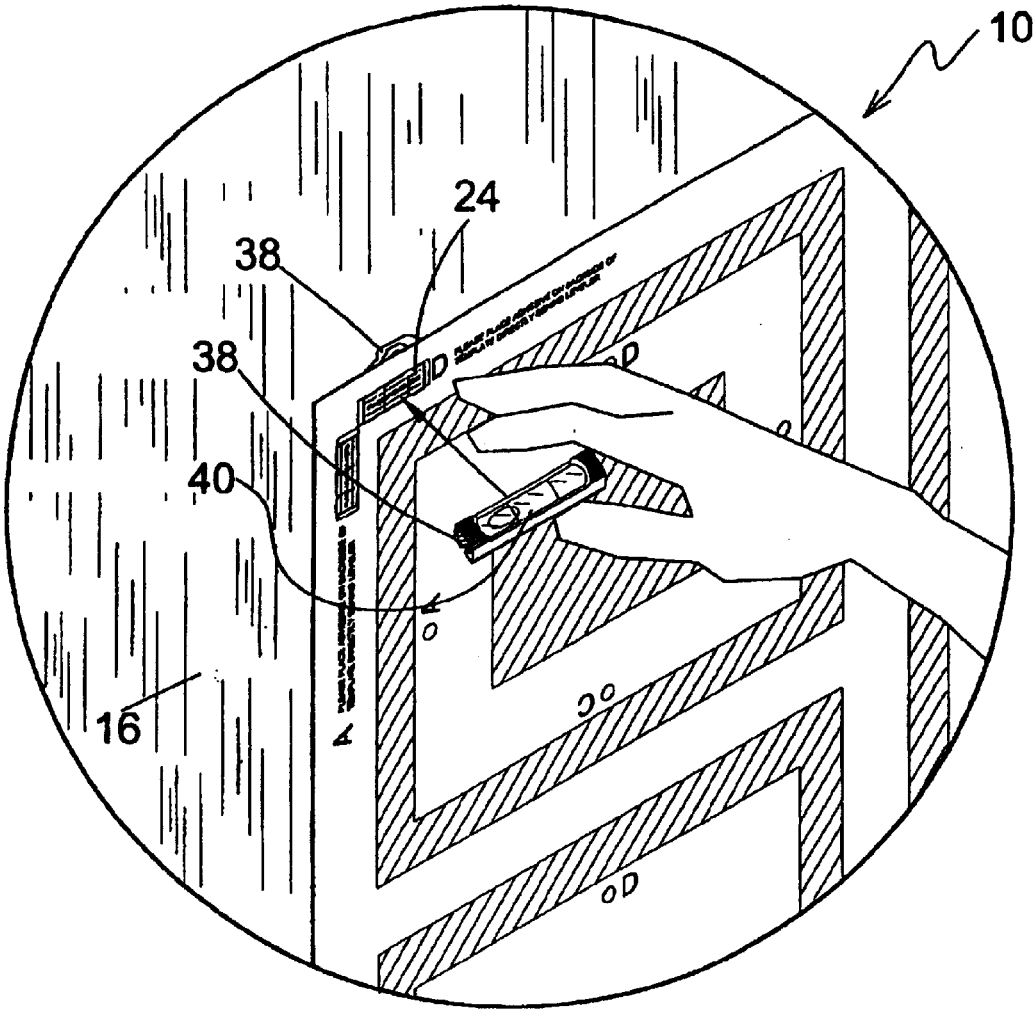
FIG. 6 is a perspective view of the present invention.

Turning to FIG. 6, shown therein is a perspective view of the present invention 10. Shown is the present invention 10 adhered to a vertical surface 16 such as a wall, by means of a non-shear, removable and adjustable adhesive 38 in the form of putty. Additionally shown is the placement of the bubble leveler 40 onto the level placement indicia 24, with the bubble leveler having a non-shear adhesive backing 38 for attachment to the level placement indicia 24.

Figure 7:
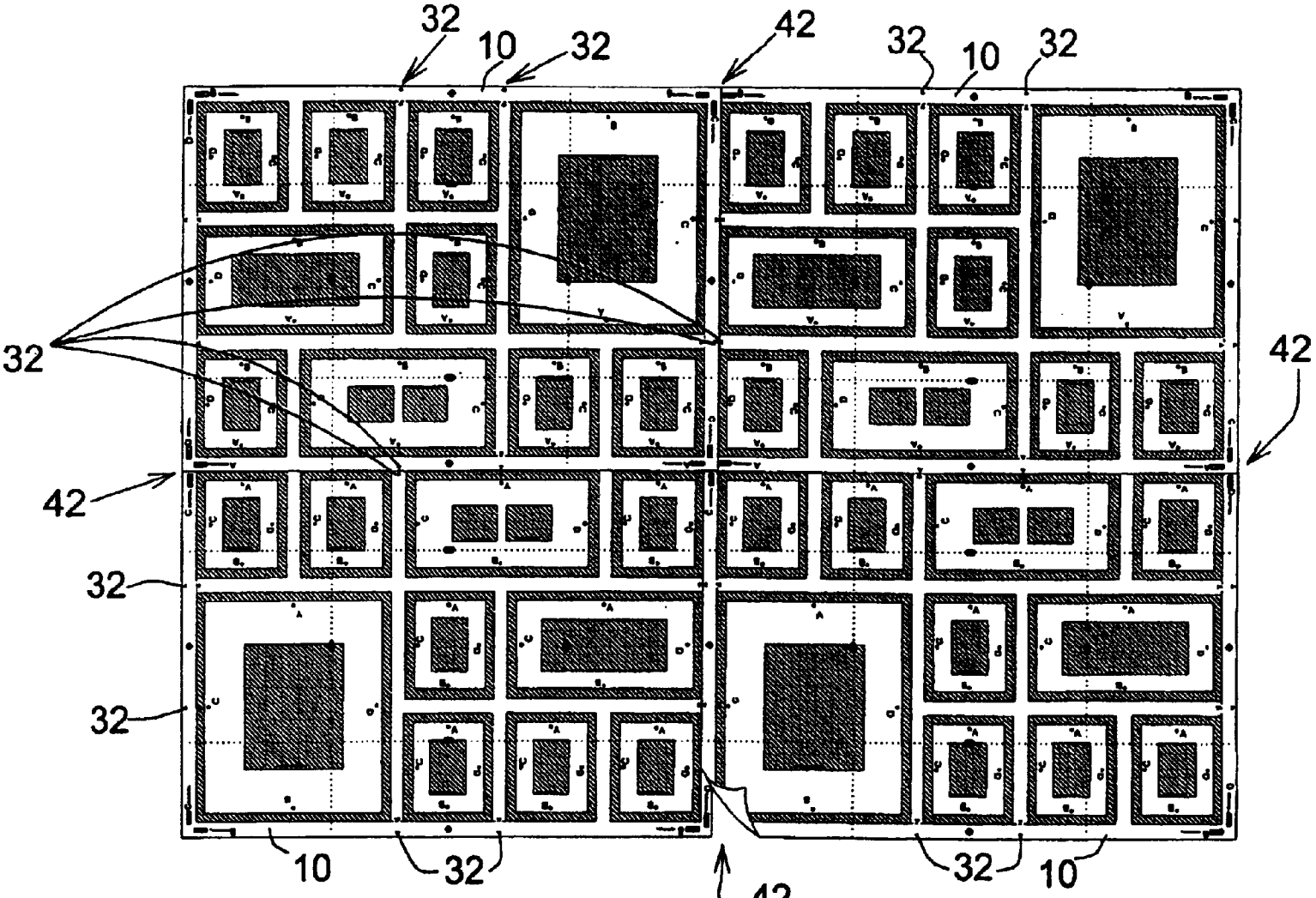
FIG. 7 is a front view of a plurality of the present invention.

Turning to FIG. 7, shown therein is a front view of a plurality of the present invention 10. Shown are multiple templates 10 overlapping at their ends or edges 42 and aligning by using the peripheral guide markers 32 as indicated. The templates 10 are arranged in a formation to show the infinite combinations that may be used. These combinations allow the present invention 10 to cover any size wall and also offer a greater atheistic appearance, function and coverage for the user.

Figure 8:
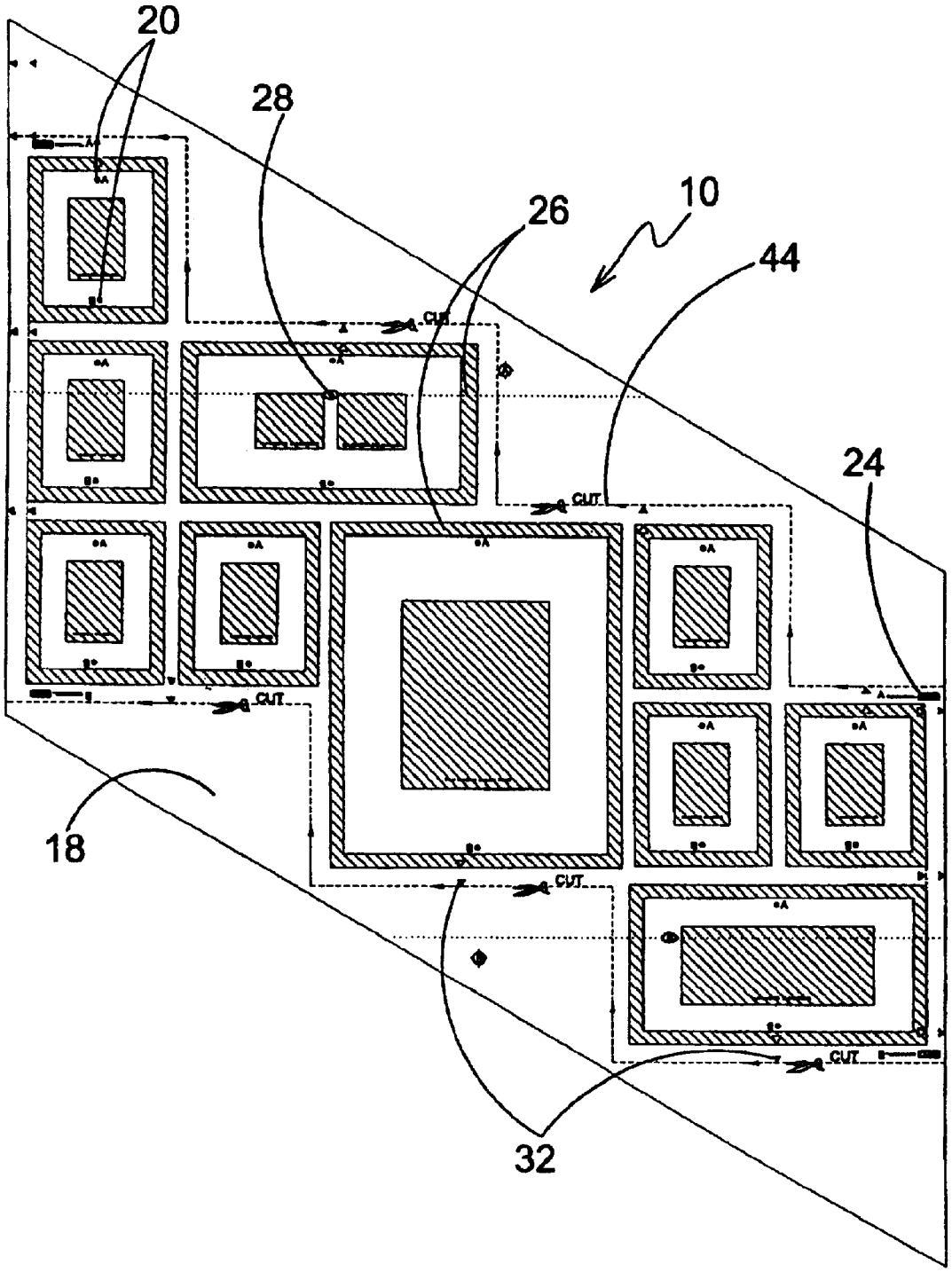
FIG. 8 is a front view of an additional element of the present invention.

Turning to FIG. 8, shown therein is a front view of an additional element of the present invention 10. Shown is an additional element of the present invention 10 that would enable the user to apply the invention on a non-horizontal or angled wall line such as a staircase wall. Shown are previously disclosed elements 18, 20, 24, 26, 28, 32 along with cutting guide 44 which allows the user to diagonally cut the sheets into usably sized portions.

Figure 9:
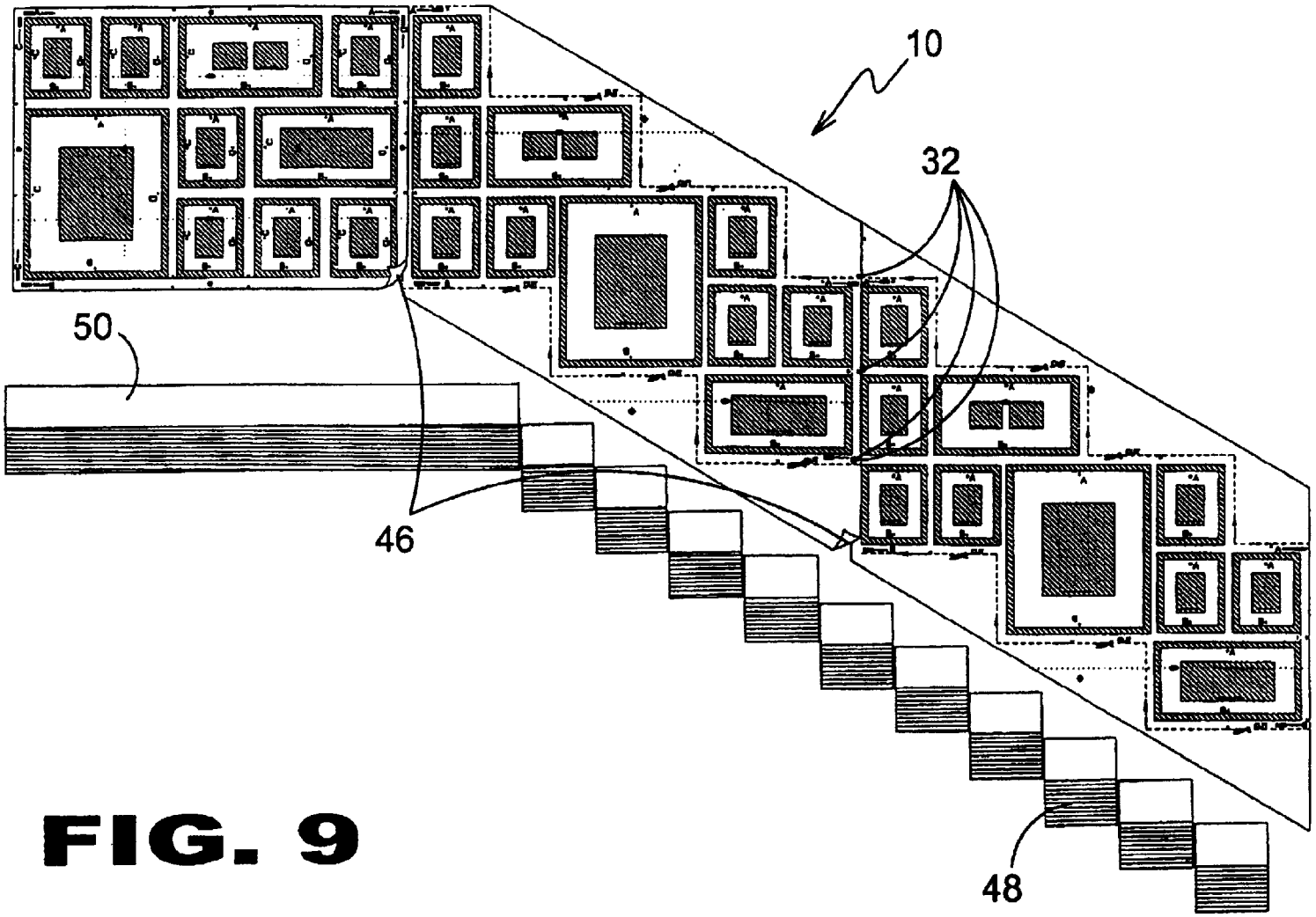
FIG. 9 is a plurality of the additional element of the present invention.

Turning to FIG. 9, shown therein is a plurality of the additional element of the present invention 10. Shown are three elements of the present invention 10 one overlapping at 46 and aligning to the other by using the peripheral guides 32. Angled templates can also be used in conjunction with rectangular instances of the present invention for staircases 48, landings 50 and hallways. The arrangement of multiple elements also offers a greater atheistic appearance, function and coverage for the user.

Figure 10:
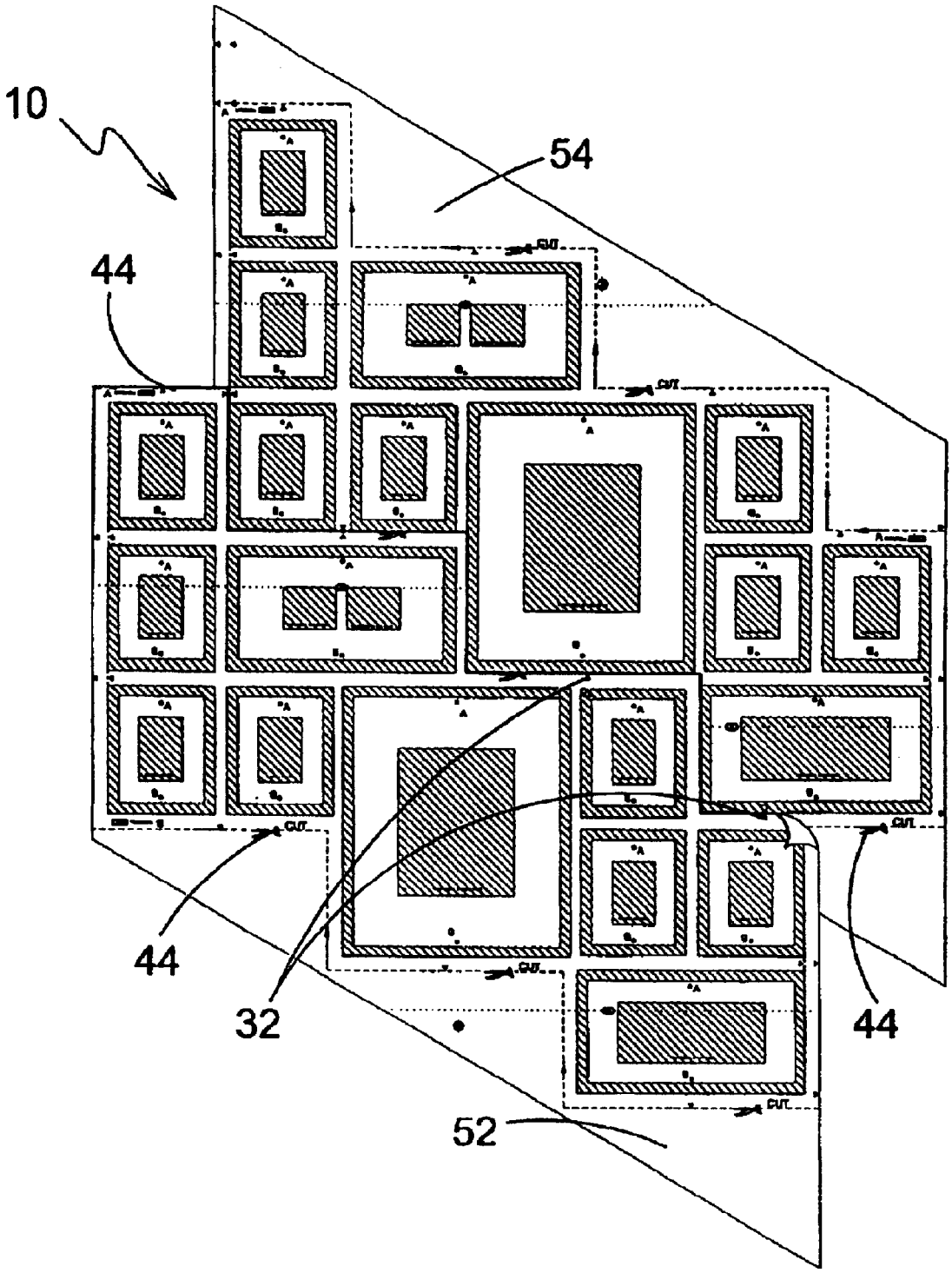
FIG. 10 is a plurality of the additional element of the present invention.

Turning to FIG. 10, shown therein is a plurality of the additional element of the present invention 10. Shown is a plurality of the present invention 10 that would enable the user to apply the invention on a large staircase wall. The template element 52 has been trimmed off using the cutting guide 44. Template element 52 can now overlap and align with template element 54 by using the peripheral guide markers 32 available on both elements 52, 54.

Figure 11:
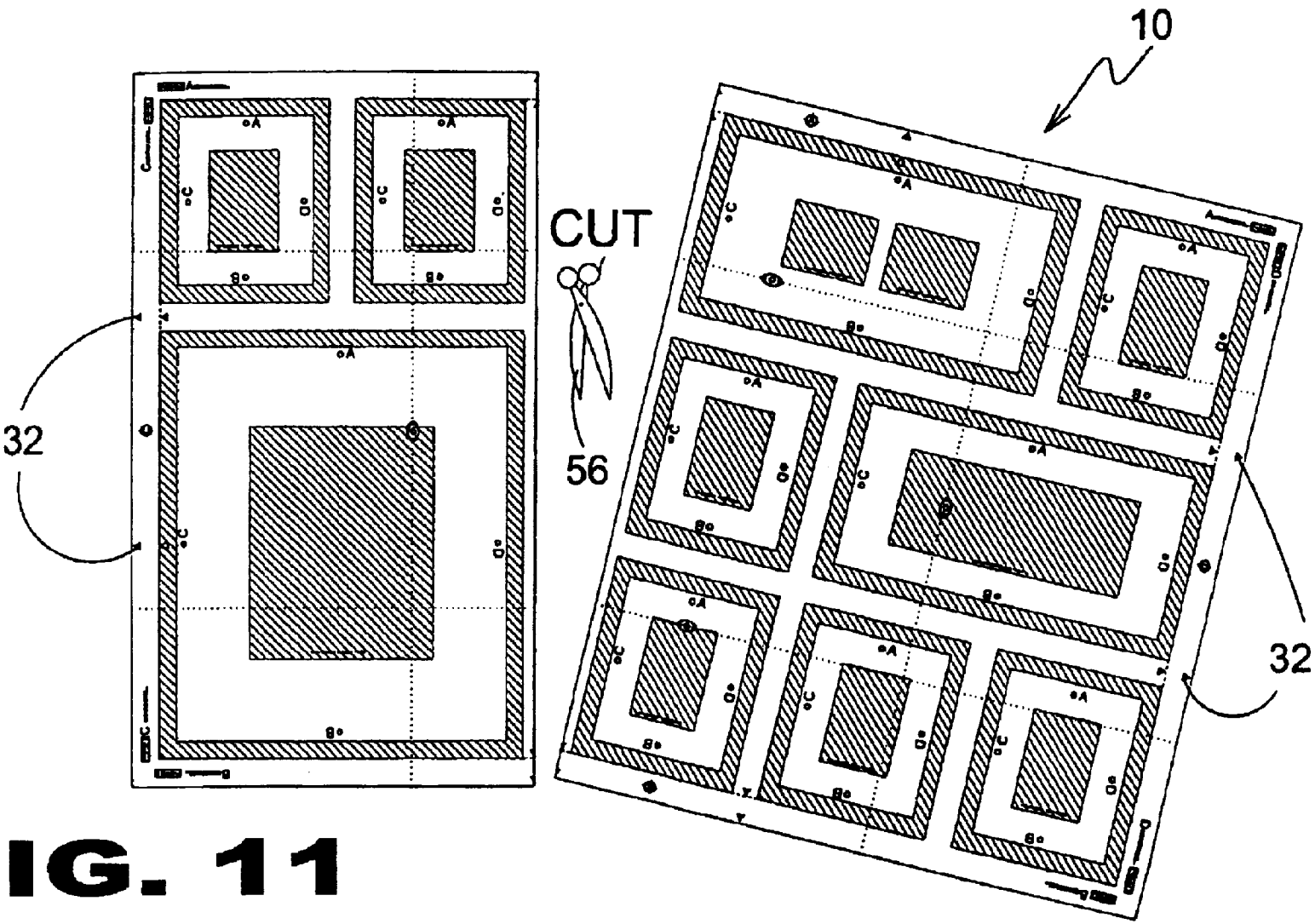
FIG. 11 is an additional element of the present invention.

Turning to FIG. 11, shown therein is an additional element of the present invention 10. Shown is the present invention 10 trimmed by scissors at 56 which would enable the user to use part of the present invention on a small wall and still have the guides 32 available for accurate and level placement of the picture frames. This ability to be separated also allows users to change configuration by combining sections of a template 10 in different ways without loosing accuracy/function of template.

Figure 12:
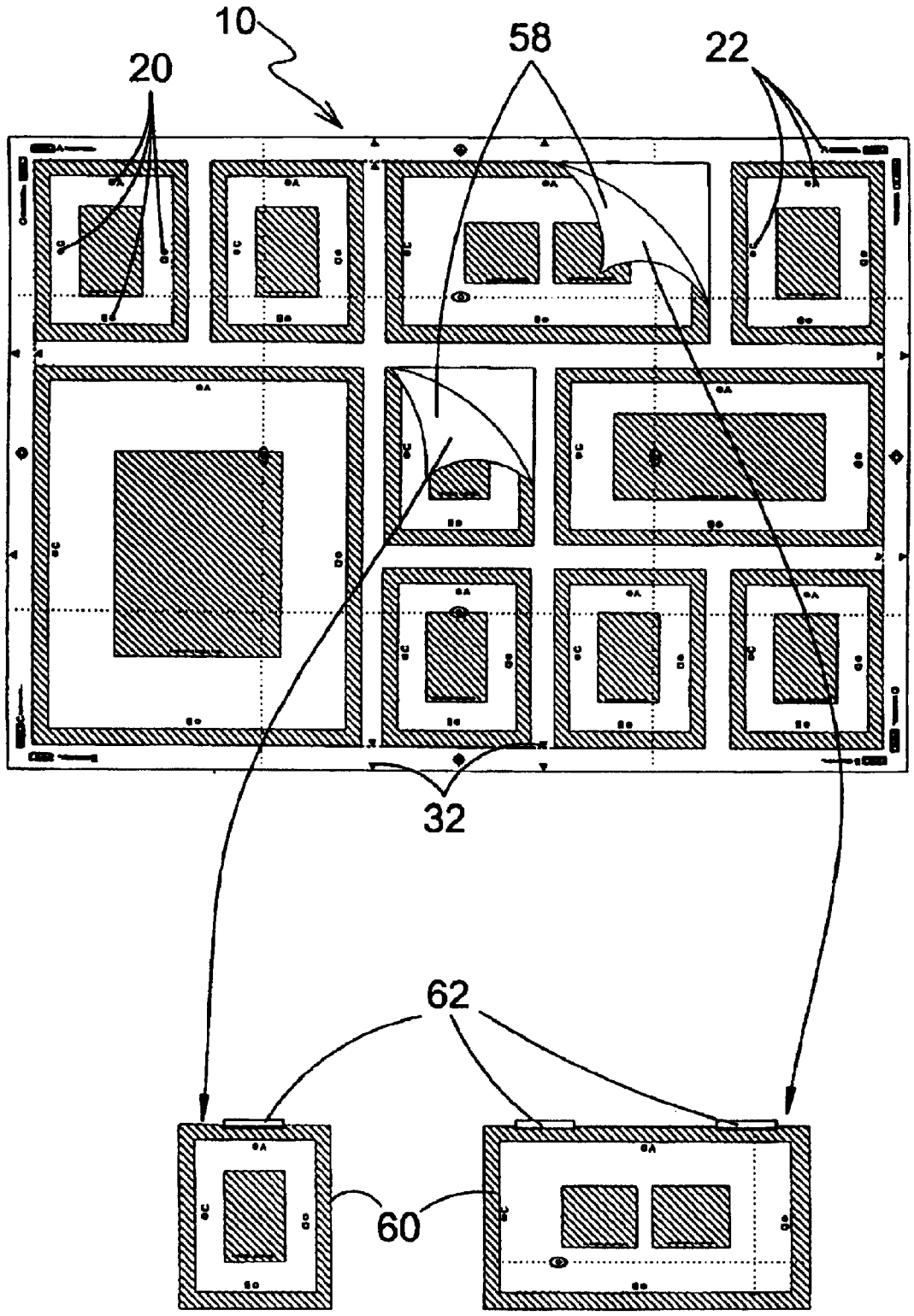
FIG. 12 is an additional element of the present invention.

Turning to FIG. 12, shown therein is an additional element of the present invention 10. Shown is an additional element of the present invention 10 wherein by cutting along the outside of the frame at 58 and removing the frame 60 from the template 10 creates an individual frame template 60. The individual templates 60 retain their indicia and when bonded to a wall using tape or the like 62 allows the user to hang individual picture frames. Other previously disclosed elements 20, 22 and 43 are also shown.

Figure 13:
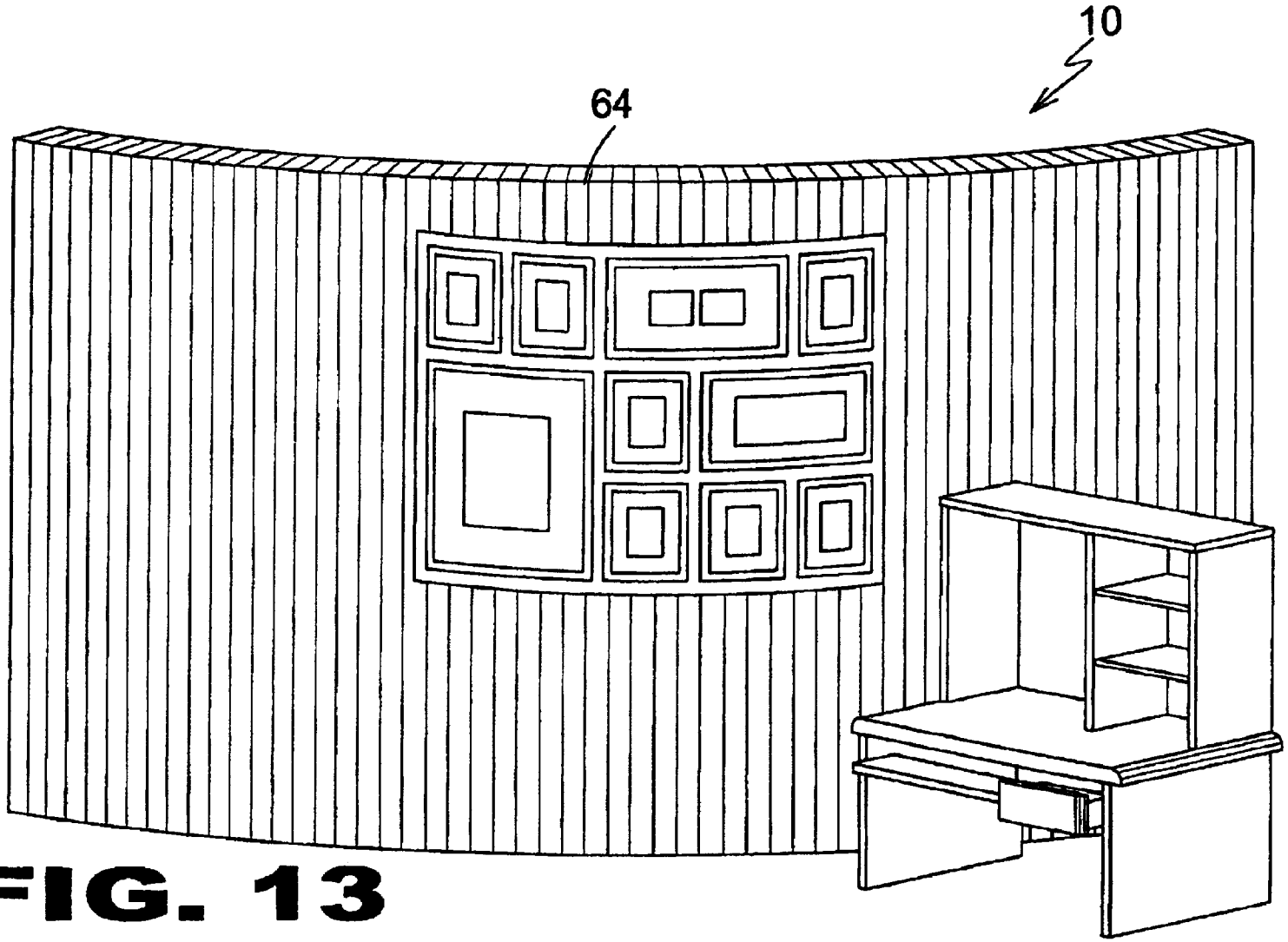
FIG. 13 is an additional element of the present invention.

Turning to FIG. 13, shown therein is an additional element of the present invention 10. Shown is the present invention 10 that would enable the user to apply the invention on a concave, curved wall 64.

Figure 14:
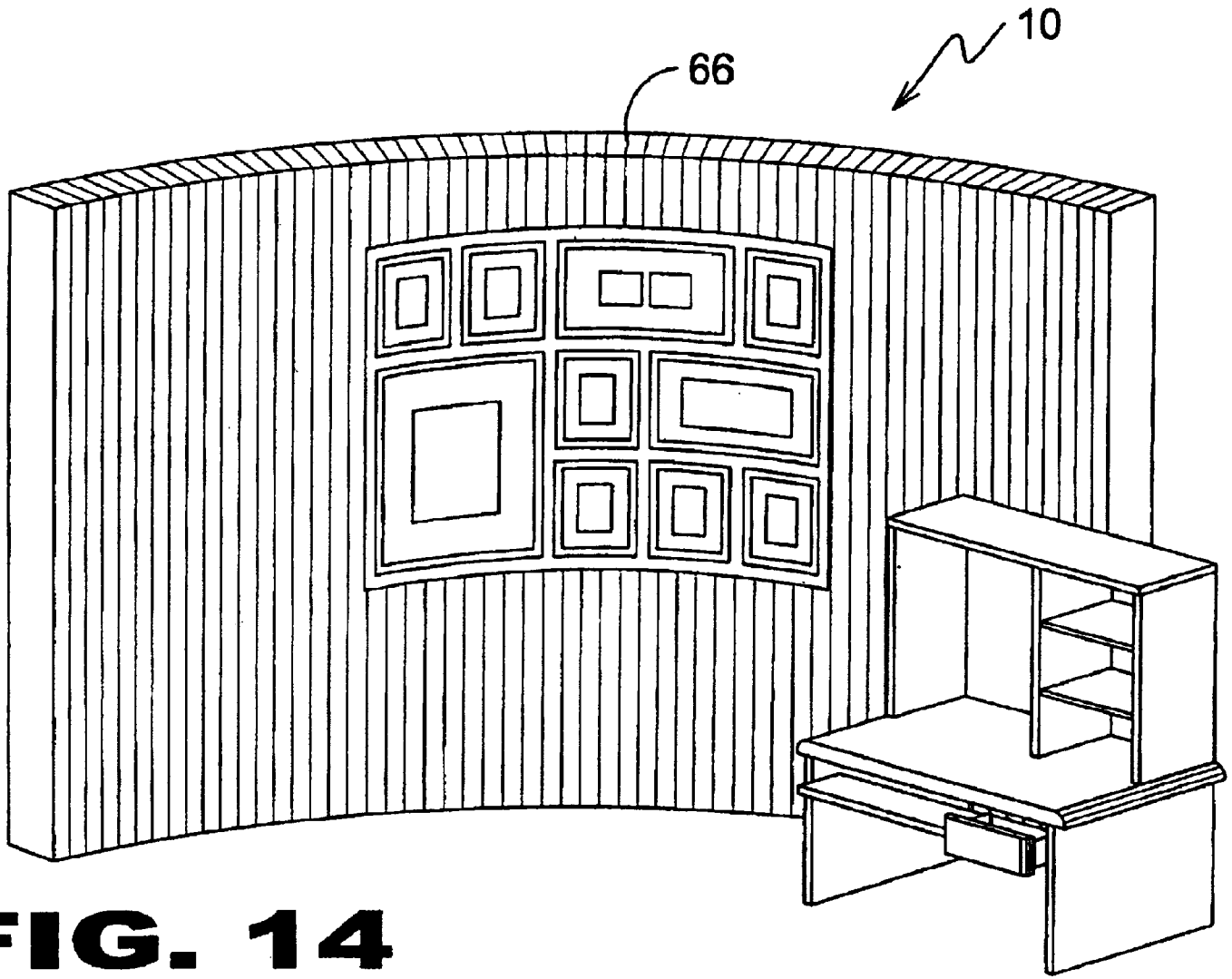
FIG. 14 is an additional element of the present invention.

Turning to FIG. 14, shown therein is an additional element of the present invention 10. Shown is the present invention that would enable the user to apply the invention on a convex, curved wall 66.

Figure 15:
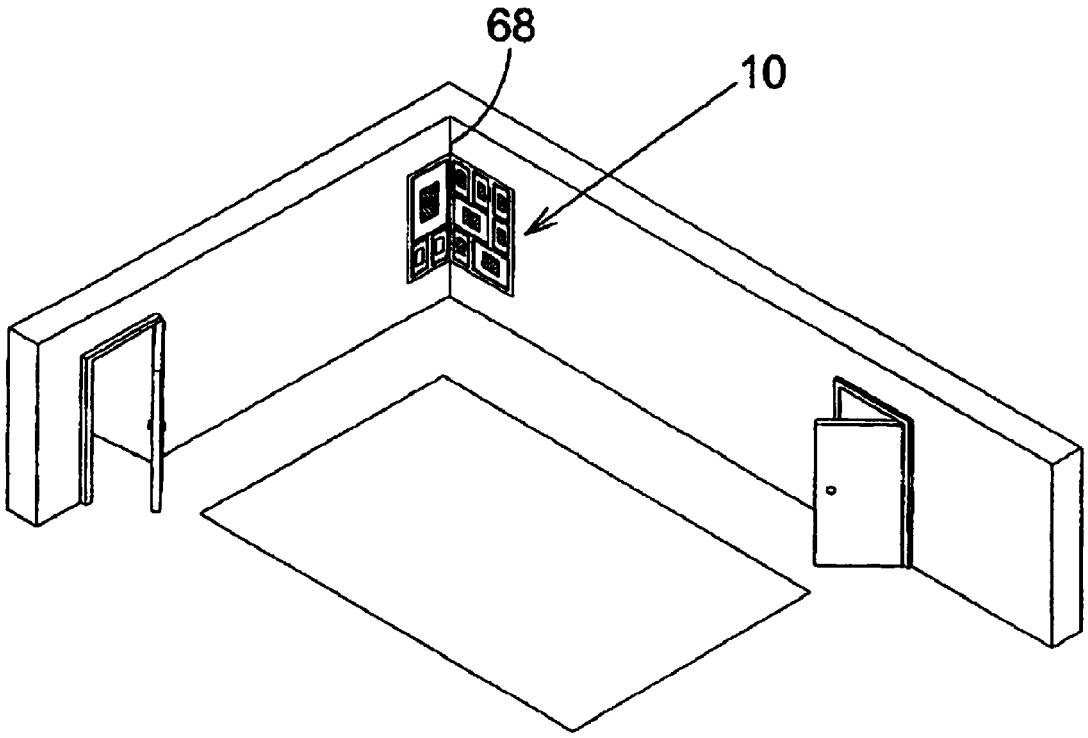
FIG. 15 is an additional element of the present invention.

Turning to FIG. 15, shown therein is an additional element of the present invention 10. Shown is the present invention 10 that would enable the user to apply the invention in a corner 68 of a wall.

Figure 16:
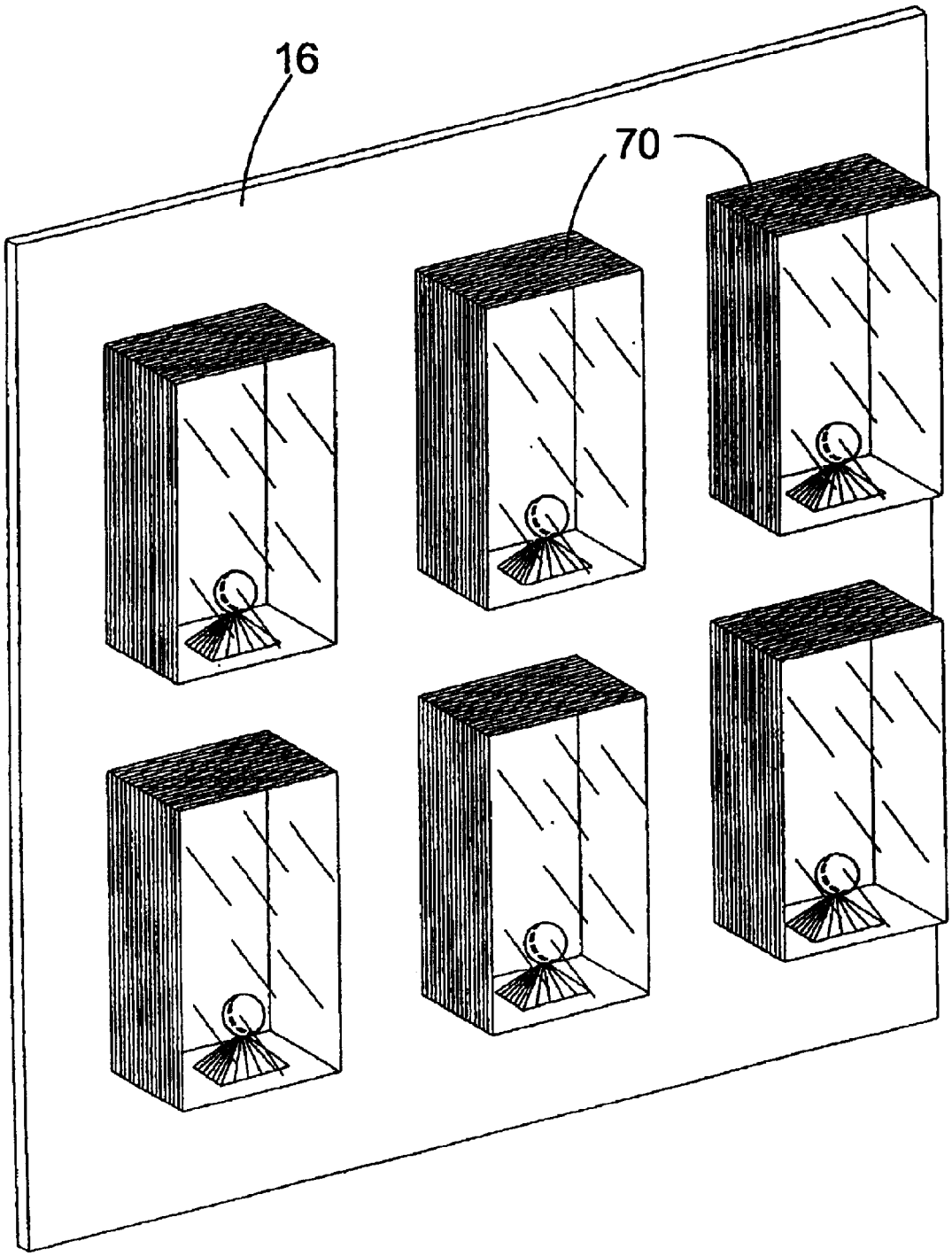
FIG. 16 is an additional element of the present invention.

Turning to FIG. 16, shown therein is an additional element of the present invention 10. Shown is the present invention 10 with 3D object viewing boxes 70 thereon. This shows that the user will be able to hang shadow boxes 70 in a level formation on a vertical surface 16 with accuracy.

Figure 17:
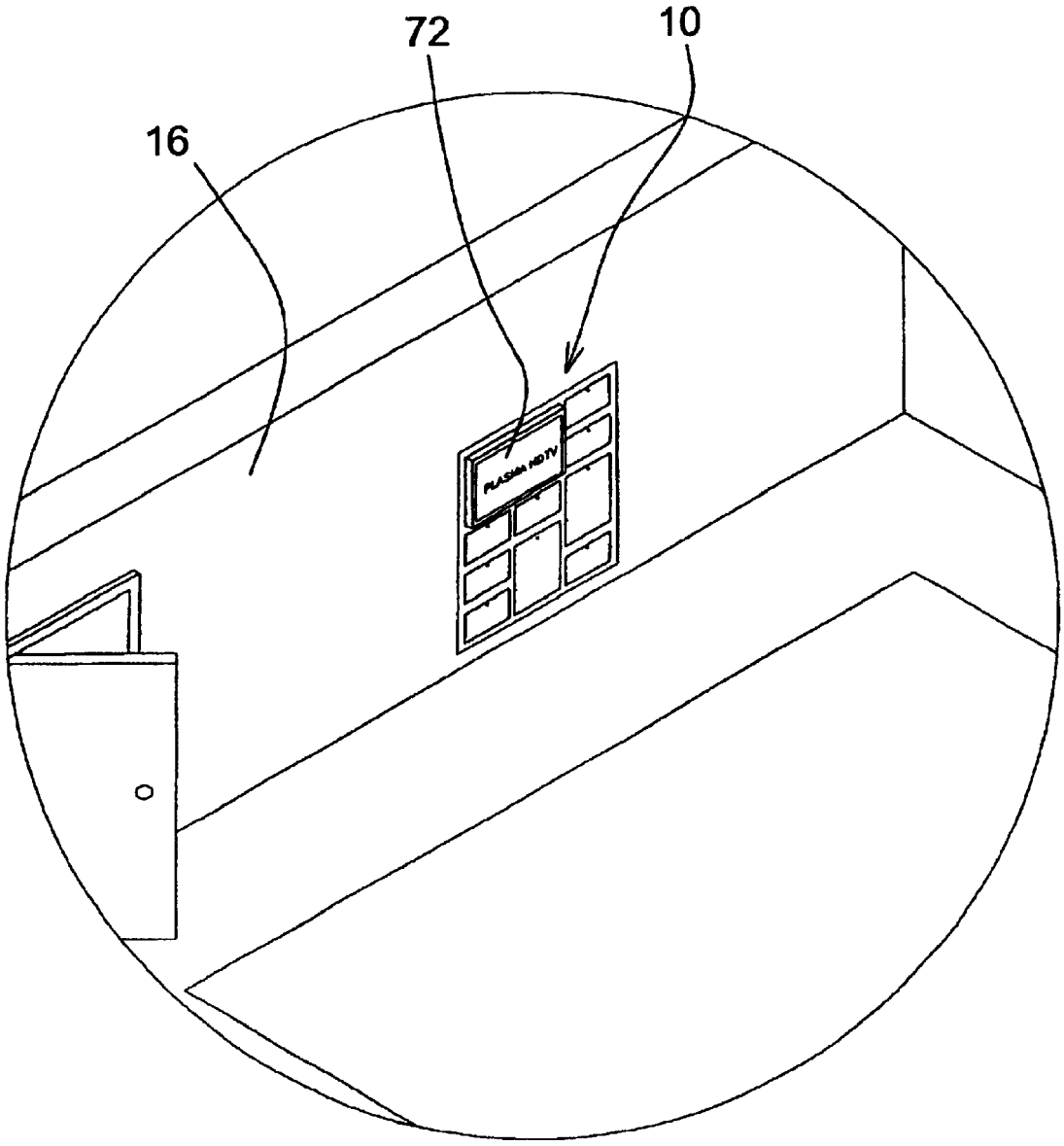
FIG. 17 is an additional element of the present invention.

Turning to FIG. 17, shown therein is an additional element of the present invention 10. Shown is the present invention with a plasma television 72 thereon. This shows that the user will be able to hang thin screen televisions 72 in a level formation on a vertical surface 16 with accuracy.

Figure 18:
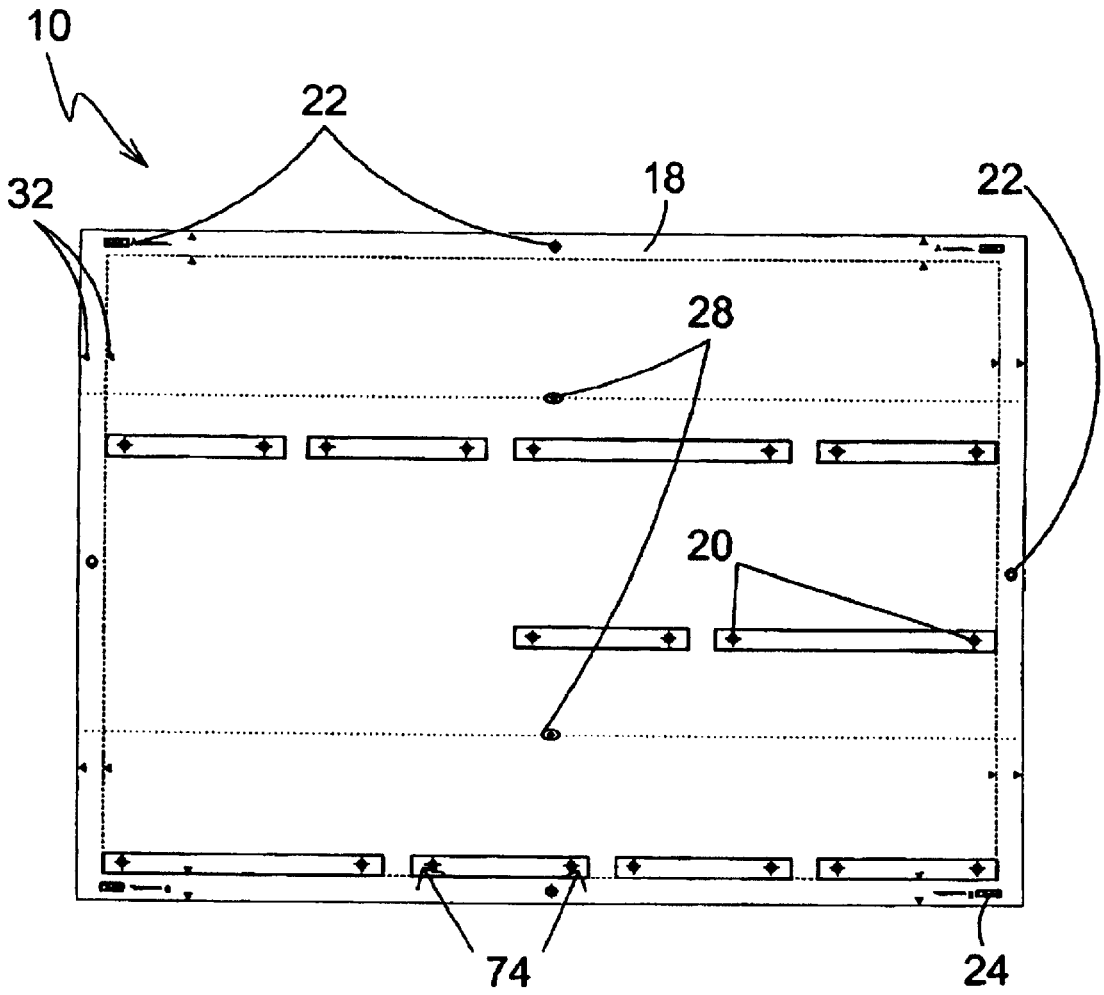
FIG. 18 is an additional element of the present invention.

Turning to FIG. 18, shown therein is an additional element of the present invention 10. Shown is the present invention 10 being a reusable sheet of planar pliable material 18 having a plurality of fastener placement markers 20 used to indicate the point where fasteners should be used. The template 10 is for hanging shelves level in a specific predetermined order. Shown are the representative shelf indicia 74, peripheral guides 32, axial correlation guide 22, eye level guides 28, bubble level placement indicia 24 and fastener placement indicia 20.

Figure 19:
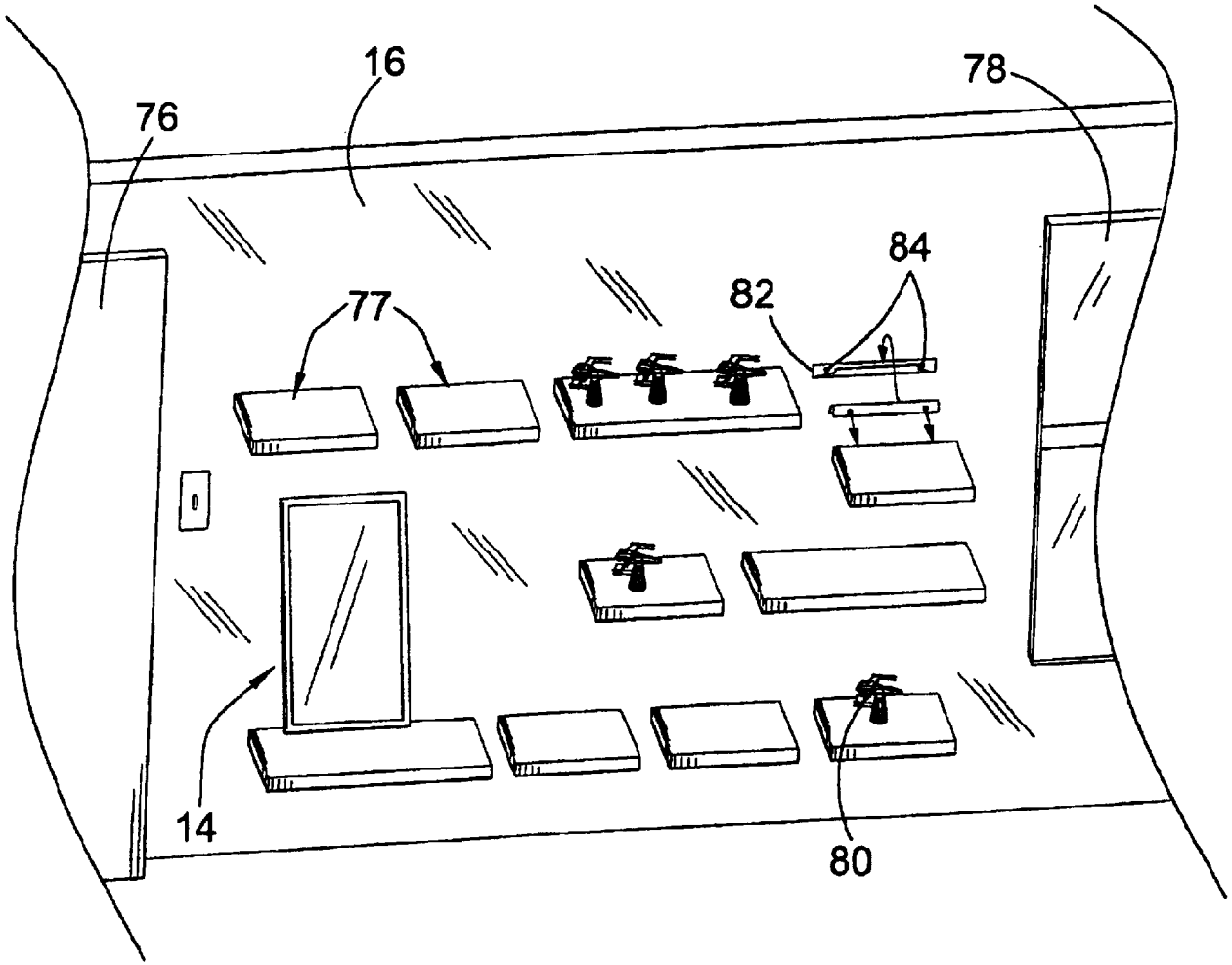
FIG. 19 is an additional element of the present invention.

Turning to FIG. 19, shown therein is an additional element of the present invention 10. Shown are shelves 76 mounted using the shelf template element of the present invention. Shown are picture frame 14, door 76, shelf 77, wall 16, window 78, displayed object 80, shelf supporting element 82, and fastener 84 placement.

The present invention is used to mark where the hooks to hang the frames should be placed. Once the area is marked, the template is removed, the hooks are applied to the wall surface and then the frames are put in place. At no time during or after this process are template and frames seen together on the wall. We have however shown them together in some cases for purpose of illustration.

I claim:

1. A template for hanging picture frames level on a wall, comprising:

a) a rectangular sheet of pliable material, wherein said sheet is planar, said sheet having a pair of opposite side edges, a top edge and a bottom edge and front and rear surfaces;

b) multiple picture frame indicia being disposed on said front of said sheet, each said frame indicia being defined by a substantially horizontal top edge and bottom edge and a substantially vertical pair of side edges, wherein a [faster] *fastener* placement marker is disposed within each said frame indica in association with each of said top, bottom and side edges being so disposed as to indicate correct fastener placement for attachment of the picture frame to the wall, wherein the picture frame being complementarily sized as said picture frame indicia can be hung level on the wall with said fastener[,] *;* c) a plurality of bubble level placement indicia being disposed on said sheet, wherein said bubble level placement indicia are disposed on [all] *two adjacent* corners of said sheet in both horizontal and vertical orientation wherein said bubble level placement indicia are so disposed as to allow said sheet and said picture frame indicia to be horizontally and vertically aligned with the wall;

d) a bubble leveler being disposed on said bubble level placement indicia, said bubble leveler being attached to said sheet using removable adhesive to permit the sheet to be leveled on the wall;

e) a removable adhesive being disposed on said rear surface of said sheet for attaching said sheet to the wall;

f) axial correlation guides being disposed adjacent said fastener placement markers [and said bubble placement indicia] *found at the top edge only* to permit the horizontal and vertical axes of the sheet to be identified;

g) a centrally disposed [eve] *eye* level guide on said sheet whereby a user can determine the correct picture height at which to place the picture frame;

h) a plurality of peripheral guides disposed [in a spaced apart relationship around the perimeter] *upon the opposite side edges* of said sheet whereby a plurality of said sheets can be joined together wherein said plurality of said sheets can be horizontally and vertically aligned with the wall; and i) [a plurality of] *one or more* cutting guide lines being disposed on said front of said sheet, wherein said sheet can be cut into parts [diagonally], a plurality of said sheets can be joined together, and said parts can be horizontally and vertically aligned with an existing feature of said wall.

2. [The] *A* method of hanging picture frames level on a wall, comprising the steps of:

a) placing on said wall a rectangular sheet of pliable material, said sheet having a pair of opposite side edges, a top edge and a bottom edge and front and rear surfaces, said sheet having multiple picture frame indicia on the front thereof, with a fastener placement marker disposed within each frame indicia so as to indicate correct fastener placement for attachment of the picture frame to the wall, a plurality of bubble level placement indicia being disposed on said sheet disposed on [all] *two adjacent* corners of said sheet in both horizontal and vertical orientation, *one* axial correlation [guides] *guide* being disposed [adjacent said fastener placement markers and said bubble placement indicia] *upon the top edge* to permit the horizontal and vertical of the sheet to be identified, a centrally disposed eye level guide on said sheet whereby a use can determine the correct picture height at which to place the picture frame, [a plurality of] *two* peripheral guides disposed [in a spaced apart relationship around the perimeter] *upon the pair of opposite side edges* of said sheet whereby a plurality of said sheets can be joined together and said plurality of said sheets can be horizontally and vertically aligned with the wall, [a plurality of] *one or more* cutting guide lines being disposed on said front of said sheet, wherein said sheet can be cut into parts [diagonally], a plurality of said sheets can be joined together, and said parts can be horizontally and vertically aligned with an existing feature of said wall, said sheet having a removable adhesive disposed on the rear surface for temporarily attaching said sheet to the wall;

b) attaching a bubble leveler on said bubble level placement indicia using removable adhesive to permit the sheet to be leveled on the wall;

c) using the peripheral guides for overlapping additional such sheets as required;

d) locating nail holes in said wall using said fastener placement markers with respective axial indicia or axial correlation guides;

e) removing said sheet from said wall; and f) mounting picture frames using nail holes located in said wall.

* * * * *